United States Patent
O'Connor

(10) Patent No.: US 7,172,335 B1
(45) Date of Patent: Feb. 6, 2007

(54) AUTOMATIC MASHED POTATO SYSTEM

(76) Inventor: Carmina F. O'Connor, 30W026 Laurel Ct., Warrenville, IL (US) 60555

( * ) Notice: Subject to any disclaimer, the term of this patent is extended or adjusted under 35 U.S.C. 154(b) by 465 days.

(21) Appl. No.: 10/388,948

(22) Filed: Mar. 13, 2003

Related U.S. Application Data

(60) Provisional application No. 60/381,714, filed on Mar. 15, 2002.

(51) Int. Cl.
*A47J 27/10* (2006.01)
(52) U.S. Cl. ............... 366/142; 366/146; 366/149; 366/192; 366/194; 366/244; 99/327; 99/335; 99/348
(58) Field of Classification Search .......... 366/142, 366/145, 146, 149, 150.1, 242, 244, 245, 366/247–251, 192, 194; 99/327, 335, 348
See application file for complete search history.

(56) References Cited

U.S. PATENT DOCUMENTS 2,275,901 A * 3/1942 Harwood ............. 219/201
5,829,344 A * 11/1998 Lande ................. 99/453
6,089,143 A    7/2000 Figueroa ............. 99/327
6,250,147 B1 * 6/2001 Perten ................ 73/169
6,550,372 B1    4/2003 Sharples ............. 99/331

* cited by examiner

Primary Examiner—David Sorkin

(57) ABSTRACT

An automatic mashed potato system for efficiently and automatically creating seasoned mashed potatoes. The automatic mashed potato system includes a housing unit having an upper cavity with a closure, a seasoning unit within the closure, a fluid collection tray removably positioned within the housing unit, a heating container positioned within the housing unit, a mixing container removably positioned within the heating container, and a mashing apparatus extending from the closure. Potatoes and water are placed within the mixing container and the heating container heats the potatoes until the potatoes are softened. An automated drain within the mixing container drains the water, then the seasoning unit inputs seasons into the mixing container and the mashing apparatus thereafter mashes the potatoes.

17 Claims, 7 Drawing Sheets

_US 7,172,335 B1_

AUTOMATIC MASHED POTATO SYSTEM

CROSS REFERENCE TO RELATED APPLICATIONS

I hereby claim benefit under Title 35, United States Code, Section 119(e) of U.S. provisional patent application Ser. No. 60/381,714 filed Mar. 15, 2002. The 60/381,714 application is currently pending. The 60/381,714 application is hereby incorporated by reference into this application.

BACKGROUND OF THE INVENTION

1. Field of the Invention

The present invention relates generally to automated food processors and more specifically it relates to an automatic mashed potato system for efficiently and automatically creating seasoned mashed potatoes.

2. Description of the Related Art

Food processing machines for assisting in the producing of various food products have been in use for years. However, there currently is no commercially available product that is capable of automatically creating mashed potatoes. The making of mashed potatoes is still relatively a labor intensive process for consumers whereby they (1) peel the potatoes, (2) boil the potatoes within a pot of water until softened, (3) drain the water from the pot, and (4) mash the potatoes with a conventional hand operated mashing device having a screen structure. Alternatively, some individuals may utilize an electric hand mixer or stand mixer instead of a hand operated mashing device.

The conventional process of making mashed potatoes is very time consuming and reduces the likelihood that a consumer will take the time to make mashed potatoes. In addition, the conventional process of making mashed potatoes results in an inconsistent product because of the various time constraints an individual encounters while attempting to prepare an entire meal. A further problem with conventional processes of producing mashed potatoes is that they do not provide a flavorful end product that can be enjoyed.

While these devices may be suitable for the particular purpose to which they address, they are not as suitable for efficiently and automatically creating seasoned mashed potatoes. Conventional food processors do not provide for the efficient and automatic producing of mashed potatoes.

In these respects, the automatic mashed potato system according to the present invention substantially departs from the conventional concepts and designs of the prior art, and in so doing provides an apparatus primarily developed for the purpose of efficiently and automatically creating seasoned mashed potatoes.

BRIEF SUMMARY OF THE INVENTION

In view of the foregoing disadvantages inherent in the known types of food processing machines now present in the prior art, the present invention provides a new automatic mashed potato system construction wherein the same can be utilized for efficiently and automatically creating seasoned mashed potatoes.

The general purpose of the present invention, which will be described subsequently in greater detail, is to provide a new automatic mashed potato system that has many of the advantages of the food processing machines mentioned heretofore and many novel features that result in a new automatic mashed potato system which is not anticipated, rendered obvious, suggested, or even implied by any of the prior art food processing machines, either alone or in any combination thereof.

To attain this, the present invention generally comprises a housing unit having an upper cavity with a closure, a seasoning unit within the closure, a fluid collection tray removably positioned within the housing unit, a heating container positioned within the housing unit, a mixing container removably positioned within the heating container, and a mashing apparatus extending from the closure. Potatoes and water are placed within the mixing container and the heating container heats the potatoes until the potatoes are softened. An automated drain within the mixing container drains the water, then the seasoning unit inputs seasons into the mixing container and the mashing apparatus thereafter mashes the potatoes.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an automatic mashed potato system that will overcome the shortcomings of the prior art devices.

A second object is to provide an automatic mashed potato system for efficiently and automatically creating seasoned mashed potatoes.

Another object is to provide an automatic mashed potato system that significantly reduces the amount of labor and time required to produce mashed potatoes.

An additional object is to provide an automatic mashed potato system that can be set to produce mashed potatoes as a specified time.

A further object is to provide an automatic mashed potato system that provides a beater structure that is aligned with a rear portion of a cover for allowing pivotal opening of the cover.

Another object is to provide an automatic mashed potato system that may utilize a steaming or boiling system for cooking the potatoes within.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
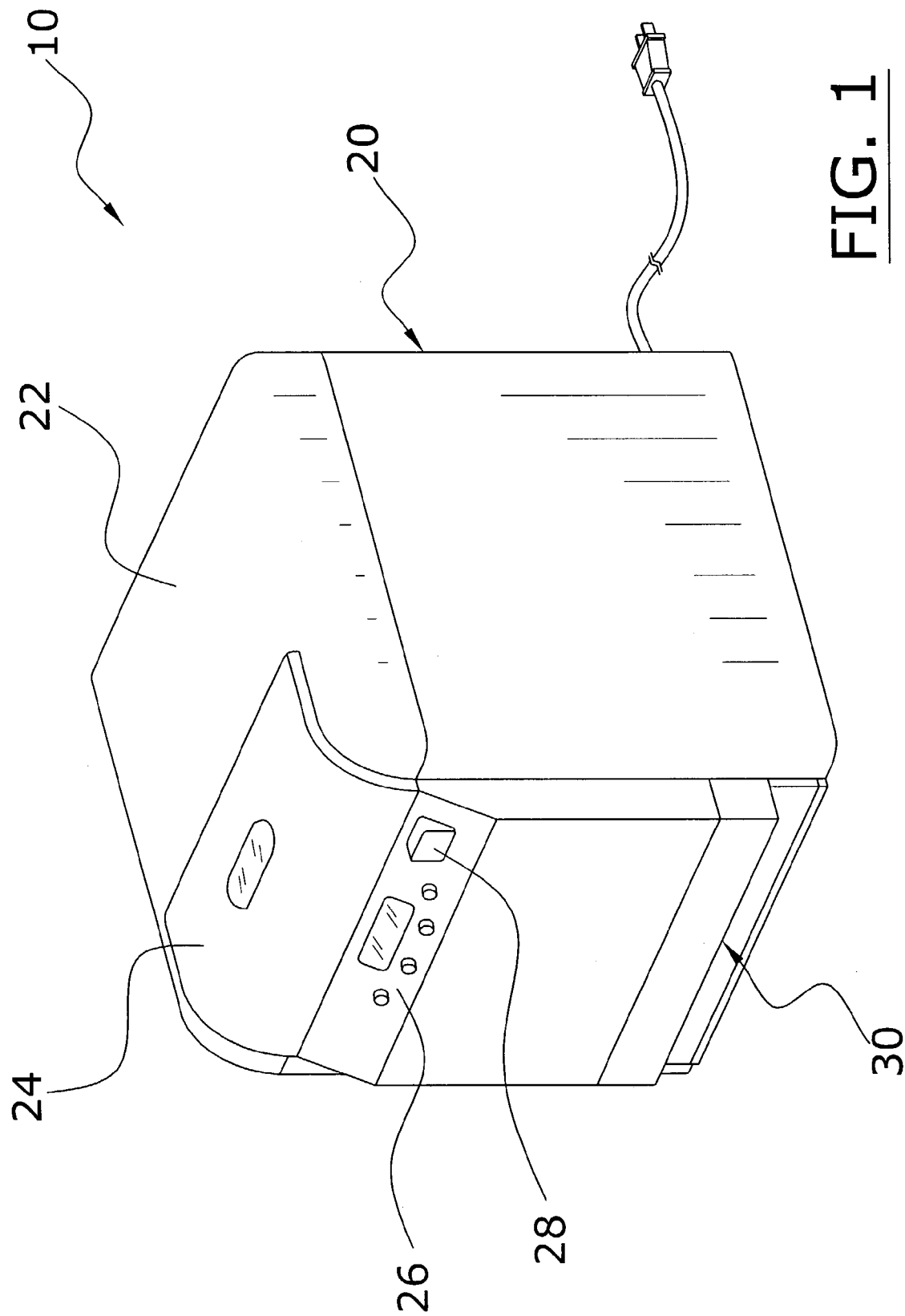
FIG. 1 is an upper perspective view of the present invention.

U.S. Pat. No. 6,089,143 provides an exemplary "mashed potato machine" invented by the present applicant. The '143 patent is hereby incorporated by reference into the present patent application. The present invention is an improvement upon the '143 patent.

Turning now descriptively to the drawings, in which similar reference characters denote similar elements throughout the several views, FIGS. 1 through 7 illustrate an automatic mashed potato system 10, which comprises a housing unit 20 having an upper cavity 21 with a closure 22, a seasoning unit 60 within the closure 22, a fluid collection tray 30 removably positioned within the housing unit 20, a heating container 40 positioned within the housing unit 20, a mixing container 50 removably positioned within the heating container 40, and a mashing apparatus 72 extending from the closure 22. Potatoes and water are placed within the mixing container 50 and the heating container 40 heats the potatoes until the potatoes are softened. An automated drain within the mixing container 50 drains the water, then the seasoning unit 60 inputs seasons into the mixing container 50 and the mashing apparatus 72 thereafter mashes the potatoes.

B. Housing Unit

Figure 2:
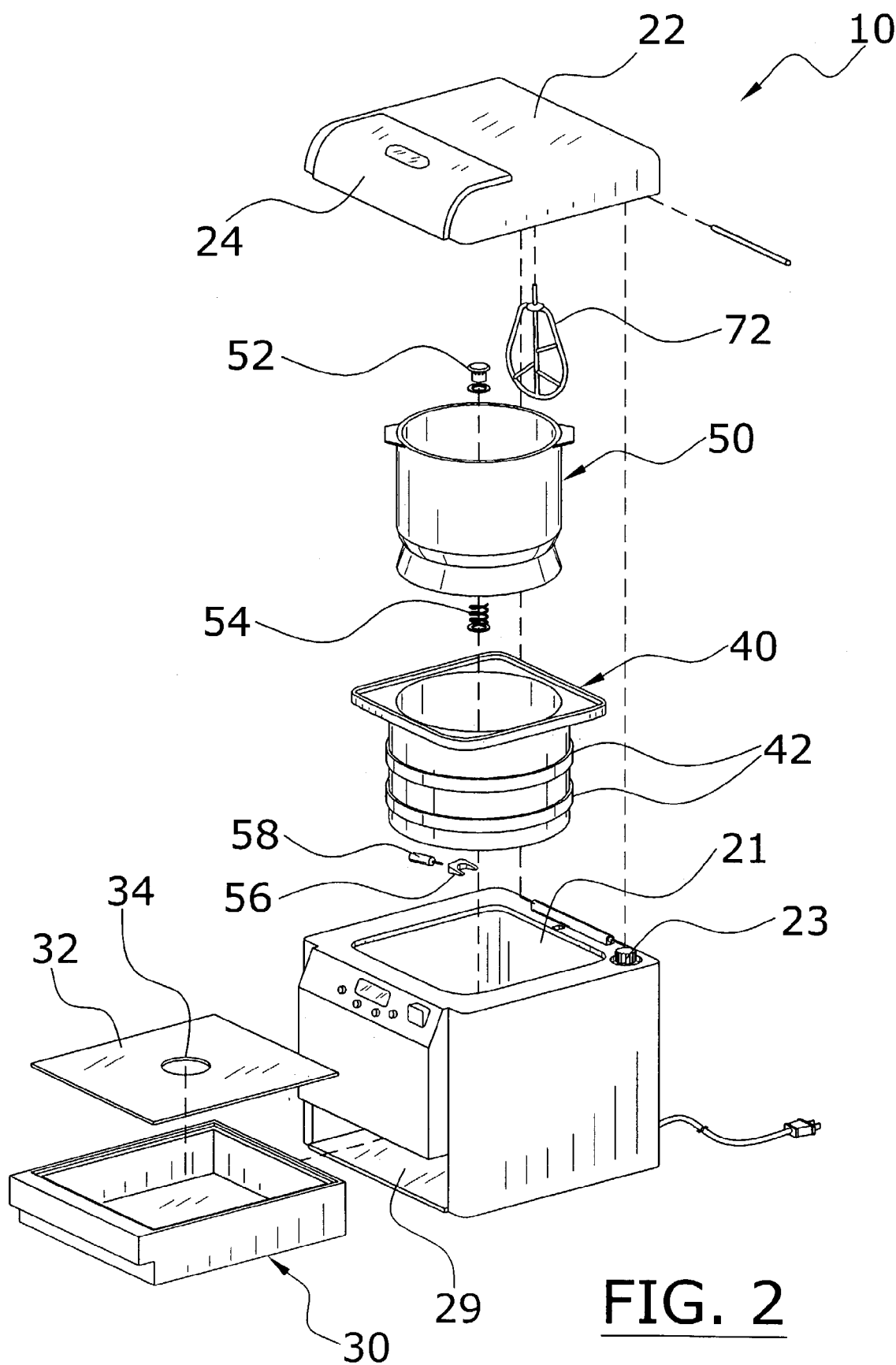
FIG. 2 is an exploded upper perspective view of the present invention.

The housing unit 20 may have various structures and configurations. FIGS. 1 and 2 illustrate an exemplary housing unit 20 which is suitable for the present invention. The housing unit 20 has an upper cavity 21 and a closure 22 for selectively closing the upper cavity 21 during operation of the present invention. The upper cavity 21 is formed for receiving the heating container 40 as shown in FIG. 5 of the drawings.

Figure 5:
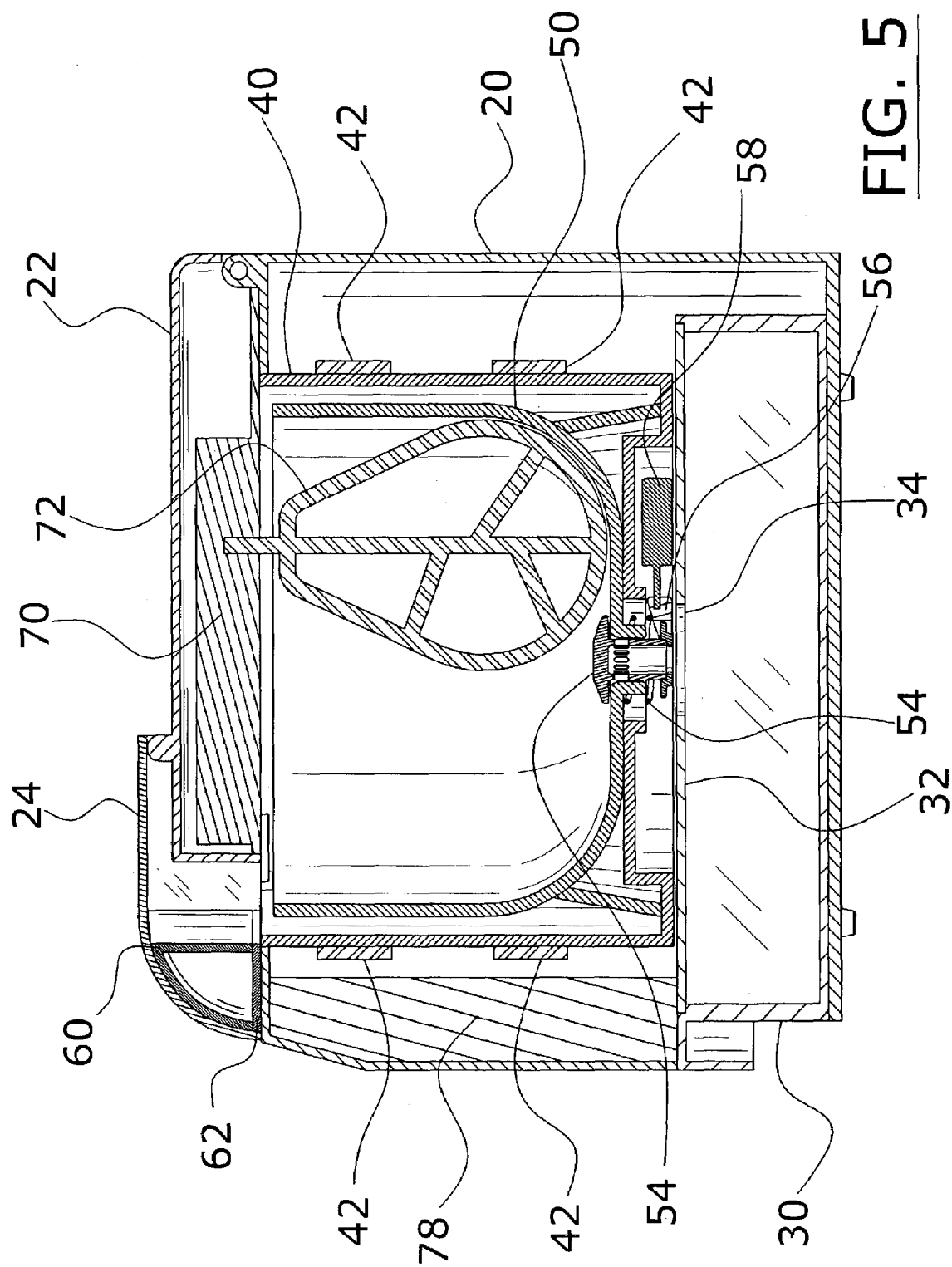
FIG. 5 is a side cutaway view of the present invention.

The closure 22 is preferably pivotally attached to the rear portion of the housing unit 20 as best illustrated in FIG. 5 of the drawings. The closure 22 preferably sealably closes the upper cavity 21 thereby retaining the contents within the mixing container 50. The closure 22 may be connected in various other manners other than illustrated in the drawings.

The housing unit 20 also preferably includes a control panel 26 for allowing for data entry, programming and control of the automatic mashed potato system. The control panel 26 also preferably includes a data display for indicating various conditions such as data entered, time remaining before completion of the mashing of potatoes, current time, current date, programmed start time/date, seasoning input time, length of time period for mashing, temperature of contents and other related data.

A removable cover 24 may be positioned about the seasoning unit 60 to allow for sealing of the contents within the mixing container 50. An open button 28 or similar structure is utilized to control the opening of the closure 22 which is commonly utilized within the food processing industry.

C. Heating Container

The heating container 40 is positioned within the housing unit 20 as best illustrated in FIGS. 2 and 5 of the drawings. The heating container 40 is comprised of a container structure that has one or more heating elements 42 surrounding an outer portion of the heating container 40. The heating container 40 has an interior portion that removably receives the mixing container 50 as best illustrated in FIG. 2 of the drawings. Various other configurations may be utilized to construct the heating container 40.

The heating elements 42 are electrically connected to the control unit 78 which controls the time and temperature of the heating elements 42. The heating elements 42 are preferably positioned about the exterior surface of the heating container 40 as shown in FIG. 2 of the drawings, however various other configurations may be utilized to achieve a desired heating of the mixing container 50 and its respective contents.

D. Mixing Container

The mixing container 50 is preferably removably positioned within the heating container 40 as best illustrated in FIGS. 2 and 5 of the drawings. The mixing container 50 is preferably comprised of a circular cross sectional area to allow for complete mixing of the contents within by the mashing apparatus 72 during rotation thereof. The mixing container 50 may be comprised of various other shapes and structures not illustrated in the drawings.

A drain assembly is fluidly positioned within a lower portion of the mixing container 50 for selectively draining fluid from within the mixing container 50 prior to mashing of potatoes. The drain assembly includes a plunger 52 movably positioned within a lower aperture within the mixing container 50, a spring 54 positioned between a lower end of the plunger 52 and a bottom side of the mixing container 50 applying a downward force upon the plunger 52 thereby sealing a flanged upper portion of the plunger 52 within an interior surface of the mixing container 50, a solenoid 58, and an engaging member 56 connected to the solenoid 58 and extendable beneath the plunger 52 to elevate the plunger 52 thereby opening the drain assembly to allow for the draining of fluid from the mixing container 50.

The solenoid 58 is in communication with the control unit 78 thereby allowing the solenoid 58 to selectively extend the engaging member 56 when draining of the fluid from the mixing container 50 is desired. Various other draining structures may be utilized to achieve draining of the fluid from the interior of the mixing container 50 as can be appreciated.

E. Seasoning Unit

The seasoning unit 60 is removably positioned within the closure 22 for releasing a seasoning material into the mixing container 50 at a predetermined time or based upon an event.

Figure 3:
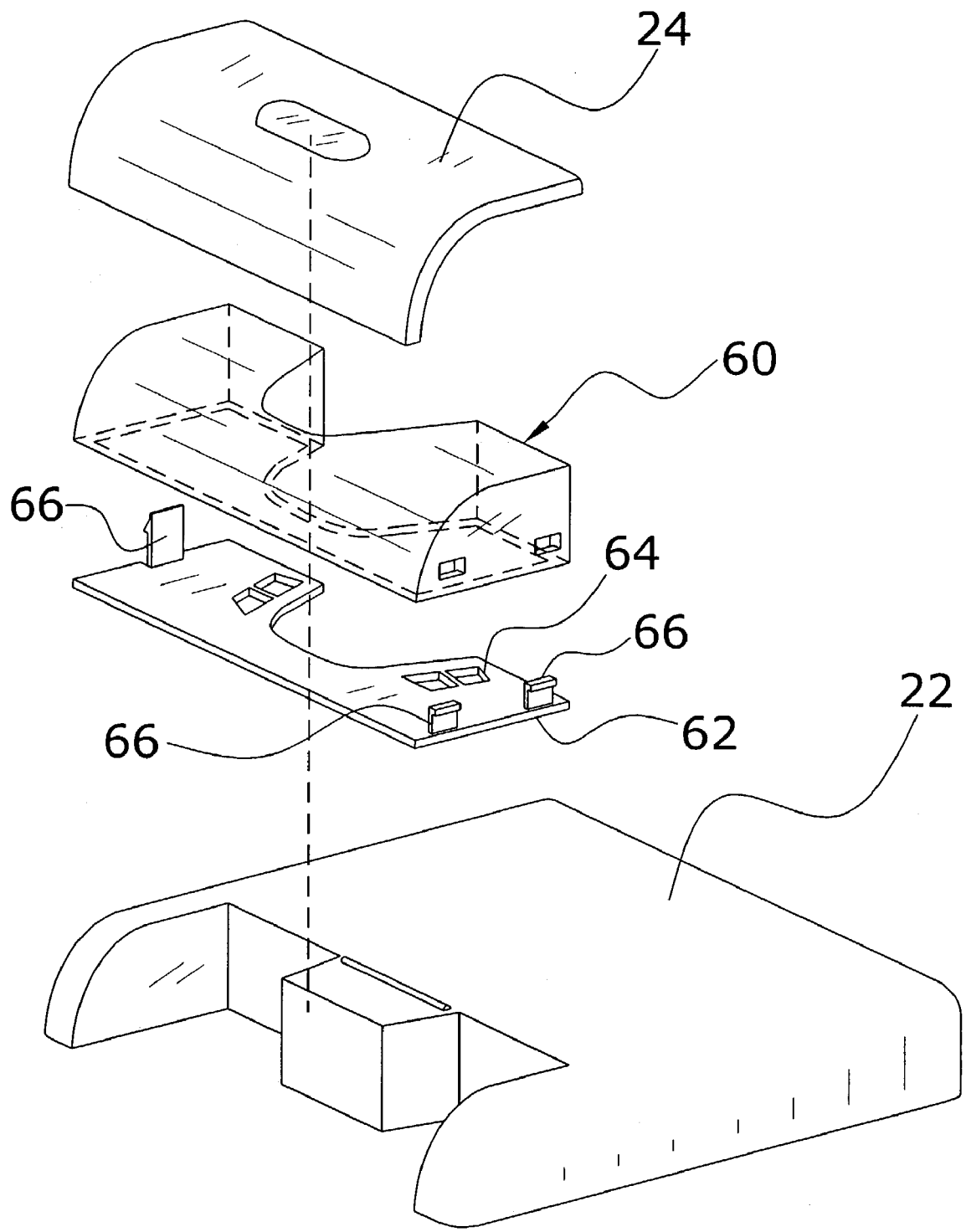
FIG. 3 is an exploded upper perspective view of the seasoning container.

The seasoning unit 60 is comprised of a container capable of storing a volume of seasoning, one or more dispensing apertures 64 within a lower portion of the container for selectively dispensing a volume of seasoning into the mixing container 50, one or more doors 65 selectively covering the dispensing aperture, and one or more latches 67 selectively retaining the doors 65 in a closed position as best illustrated in FIG. 3 of the drawings.

The doors 65 are preferably pivotally attached to the container in a biased manner with spring 54s or other biasing structure. The container preferably includes a removable base cover 62 for allowing refilling of the container, wherein the removable base cover 62 includes a plurality of prongs 66 that catchably engage within apertures within the container as best illustrated in FIG. 3 of the drawings. Various actuator devices may be utilized to open and close the doors 65 within the seasoning unit 60.

F. Mashing Unit

The mashing unit extends from the closure 22 for mashing potatoes within the mixing container 50 as shown in FIG. 5 of the drawings. The mashing apparatus 72 preferably includes a beater structure, wherein a motor 75 rotates the beater structure. The beater structure is preferably positioned towards a rear portion of the mixing container 50 upon completion of mashing of potatoes. The beater structure is also preferably positioned towards a rear portion of the mixing container 50 after opening of the closure 22.

The position of the beater structure is rotated within the mixing container 50 by a rotating unit 70 supporting the beater structure. The rotating unit 70 may be comprised of a planetary gear structure or other structure capable of rotating within the closure 22. The rotating unit 70 ensures that the mashing apparatus 72 completely mixes and mashes the mashed potatoes.

The rotating unit 70 and the mashing apparatus 72 are powered by the motor 75 positioned either within the housing unit 20 or the closure 22. If the motor 75 is positioned within the housing unit 20, a coupler 23 extends from the upper end of the housing unit 20 to engage a drive mechanism within the closure 22 thereby driving the rotating unit 70 and the mashing apparatus 72.

Figure 6:
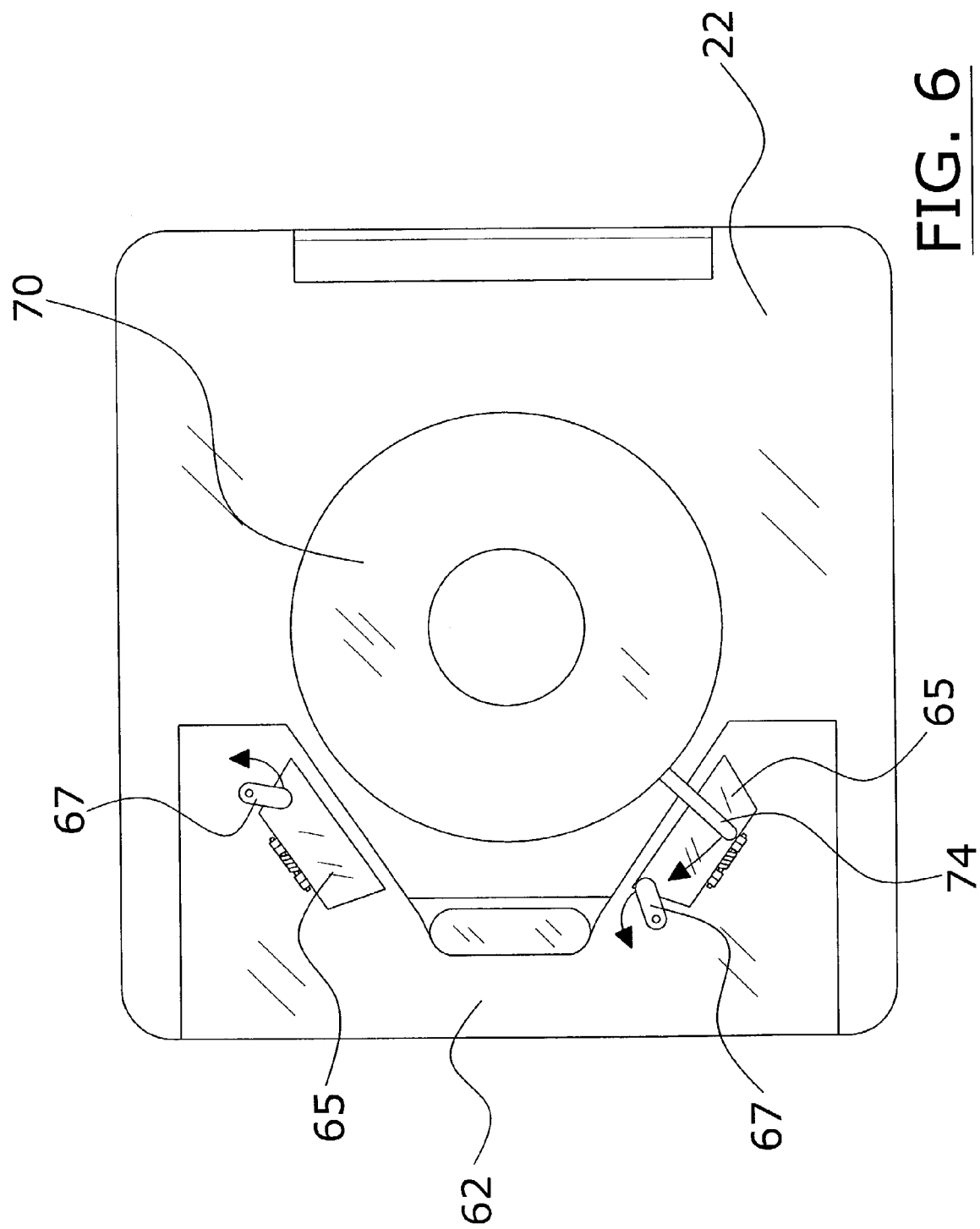
FIG. 6 is a bottom view of the automated seasoning container.

The mashing unit preferably includes an engaging arm 74 attached to a rotating unit 70 that selectively engages the latches 67 thereby releasing the latches 67 and allowing for the doors 65 to open as best illustrated in FIG. 6 of the drawings. The spring 54 loaded doors 65 thereby open automatically releasing the contents of the seasoning unit 60.

G. Fluid Collection Tray

The fluid collection tray 30 is preferably removably positioned within a lower cavity 29 of the housing unit 20 for receiving fluid from the mixing container 50 as shown in FIGS. 1 and 2 of the drawings. The fluid collection tray 30 includes a removable splash cover 32 with a drain aperture 34 within. The drain aperture 34 receives the fluid from the mixing container 50 as best illustrated in FIG. 5 of the drawings.

H. Electrical Components

Figure 4:
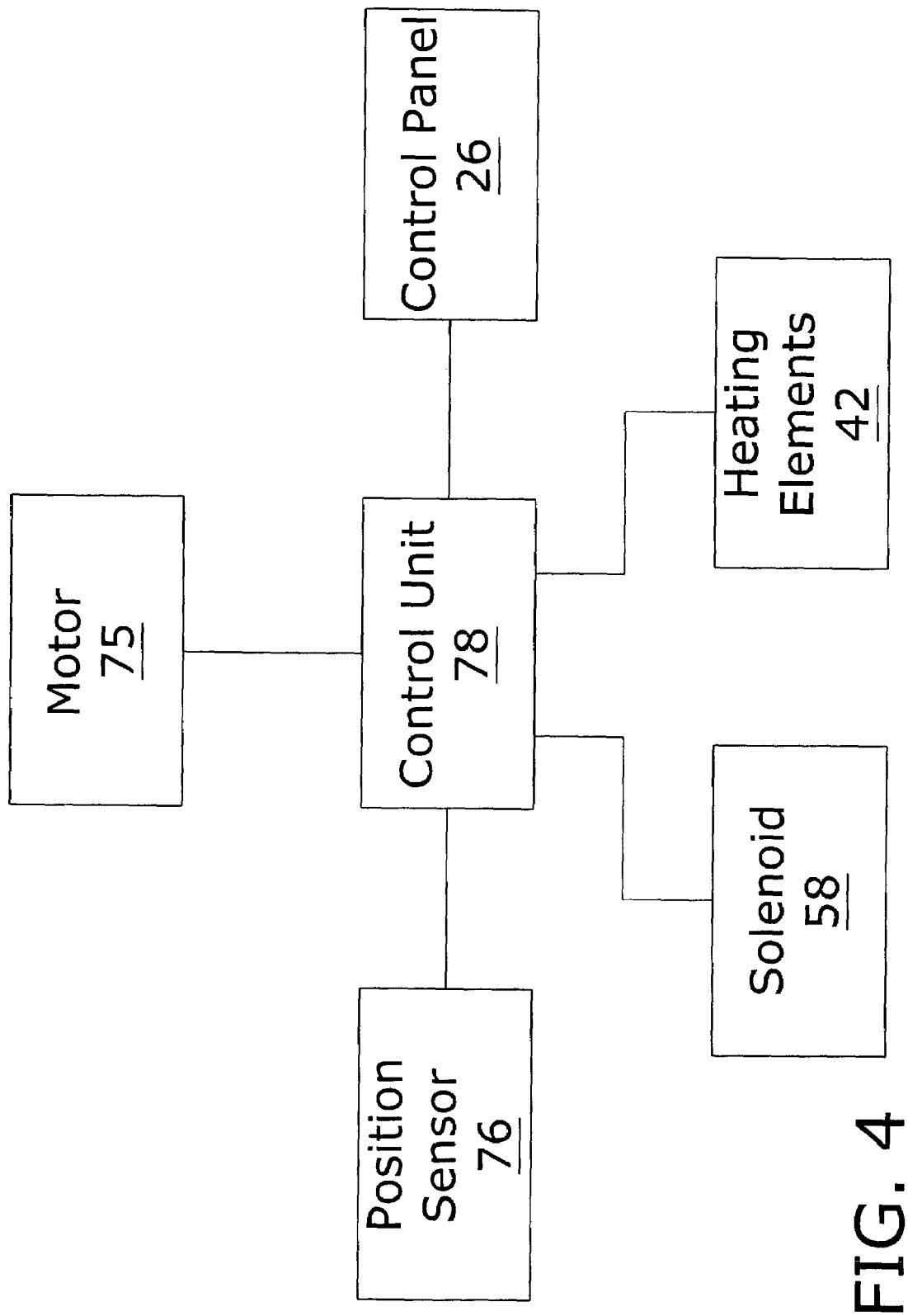
FIG. 4 is a block diagram illustrating the electrical components of the present invention.

The control unit 78 in communication with the control panel 26 as best illustrated in FIG. 4 of the drawings. The control unit 78 is preferably programmable to allow for the entry of various configuration data. A position sensor 76 is attached within the closure 22 for determining a position of the mashing unit within the mixing container 50. The position sensor 76 is in communication with the control unit 78 to indicate the same.

I. Operation of Present Invention

Figure 7:
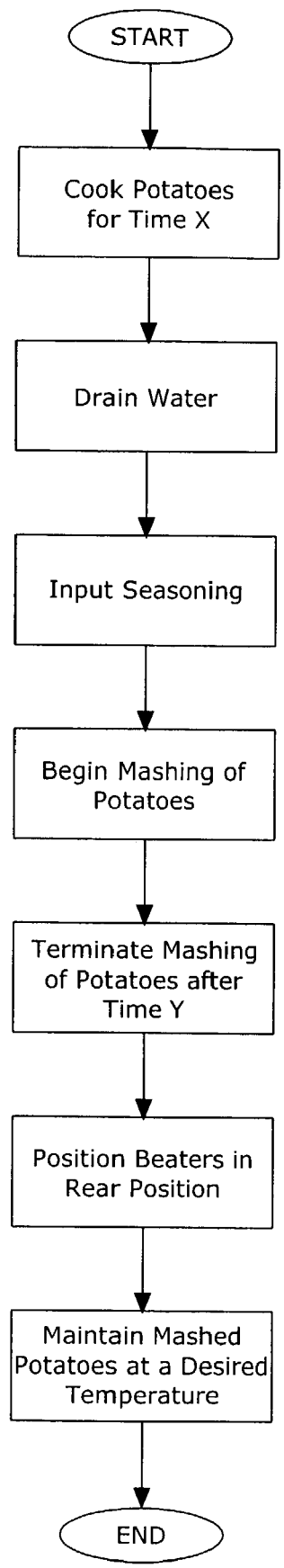
FIG. 7 is a flowchart illustrating the overall functionality of the present invention.

The user first prepares the potatoes and seasoning to be positioned within the automatic mashed potato system 10. The volume of potatoes are placed within the mixing container 50 along a volume of fluid such as water. The heating container 40 is thereafter heated thereby heating the mixing container 50 and its contents. The potatoes are heated until the potatoes are in a softened state. The determination of the state of the potatoes may be based upon a programmed or predetermined time period at a specific temperature of the contents within the mixing container 50. After the potatoes are softened, the fluid is drained from the mixing container 50 through the draining apparatus into the fluid collection tray 30. The seasoning material from the seasoning unit 60 is then dispensed into the mixing container 50. After or during the entry of the seasoning material into the mixing container 50, the mashing apparatus 72 is rotated thereby mixing the potatoes with the seasoning material. The mashing apparatus 72 is also moved in a rotating manner by the rotating unit 70 to engage the material along the entire interior of the mixing container 50. The mashing of the potatoes may continue for a predetermined time period or until the user opens the closure 22. After the potatoes have been thoroughly mashed, the mashed potatoes are thereafter maintained at a desirable temperature until the user shuts off the automatic mashed potato system 10 as shown in FIG. 7 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An automatic mashed potato system, comprising:
a housing unit having an upper cavity with a closure;
a heating container positioned within said housing unit;
a mixing container removably positioned within said heating container;
a seasoning unit within said closure for releasing a seasoning material into said mixing container at a predetermined time;
a mashing unit extending from said closure for mashing potatoes within said mixing container; and a drain assembly fluidly positioned within a lower portion of said mixing container for selectively draining fluid from within said mixing container prior to mashing of potatoes, wherein said drain assembly is comprised of:
  a plunger movably positioned within a lower aperture within said mixing container;
  a spring positioned between a lower end of said plunger and a bottom side of said mixing container applying a downward force upon said plunger thereby sealing a flanged upper portion of said plunger within an interior surface of said mixing container;
  a solenoid; and
  an engaging member connected to said solenoid and extendable beneath said plunger to elevate said plunger thereby opening said drain assembly to allow for the draining of fluid from said mixing container.

2. The automatic mashed potato system of claim 1, wherein said mashing apparatus includes a beater structure, wherein a motor rotates said beater structure.

3. The automatic mashed potato system of claim 2, wherein said beater structure is positioned towards a rear portion of said mixing container upon completion of mashing of potatoes.

4. The automatic mashed potato system of claim 2, wherein said beater structure is positioned towards a rear portion of said mixing container after opening of said closure.

5. The automatic mashed potato system of claim 2, wherein a position of said beater structure is rotated within said mixing container by a rotating unit supporting said beater structure.

6. The automatic mashed potato system of claim 1, including a fluid collection tray removably positioned within said housing unit for receiving fluid from said drain assembly.

7. The automatic mashed potato system of claim 1, wherein said seasoning unit is comprised of:
  a container capable of storing a volume of seasoning;
  one or more dispensing apertures within a lower portion of said container for selectively dispensing a volume of seasoning into said mixing container;
  one or more doors selectively covering said dispensing aperture; and
  one or more latches selectively retaining said doors in a closed position.

8. The automatic mashed potato system of claim 7 wherein said mashing unit includes an engaging arm that selectively engages said latches thereby releasing the latches and allowing for the doors to open.

9. The automatic mashed potato system of claim 7 wherein said doors are pivotally attached to said container in a biased manner.

10. The automatic mashed potato system of claim 7 wherein said container includes a removable base cover for allowing refilling of said container.

11. The automatic mashed potato system of claim 10 wherein said removable base cover includes a plurality of prongs that catchably engage within apertures within said container.

12. The automatic mashed potato system of claim 1, wherein said heating container includes one or more heating elements surrounding an outer portion of said heating container.

13. The automatic mashed potato system of claim 1, including a fluid collection tray removably positioned within said housing unit for receiving fluid from said mixing container.

14. The automatic mashed potato system of claim 13, wherein said fluid collection tray includes a splash cover with a drain aperture within.

15. The automatic mashed potato system of claim 1, including:
  a control panel; and
  a control unit in communication with said control panel, wherein said control unit is programmable.

16. The automatic mashed potato system of claim 1, including a sensor unit for determining a position of said mashing unit within said mixing container.

17. An automatic mashed potato system, comprising:
  a housing unit having an upper cavity with a closure;
  a heating container positioned within said housing unit;
  a mixing container removably positioned within said heating container;
  a seasoning unit within said closure for releasing a seasoning material into said mixing container at a predetermined time, wherein said seasoning unit is comprised of:
    a container capable of storing a volume of seasoning;
    one or more dispensing apertures within a lower portion of said container for selectively dispensing a volume of seasoning into said mixing container;
    one or more doors selectively covering said dispensing aperture; and
    one or more latches selectively retaining said doors in a closed position; and
  a mashing unit extending from said closure for mashing potatoes within said mixing container.

* * * * *